US011942233B2

(12) United States Patent
Rogers

(10) Patent No.: US 11,942,233 B2
(45) Date of Patent: Mar. 26, 2024

(54) FIRE RESISTANT CORRUGATED COAXIAL CABLE

(71) Applicant: American Fire Wire, Inc., Minden, NV (US)

(72) Inventor: William E. Rogers, Danville, CA (US)

(73) Assignee: American Fire Wire, Inc., Minden, NV (US)

(*) Notice: Subject to any disclaimer, the term of this patent is extended or adjusted under 35 U.S.C. 154(b) by 0 days.

(21) Appl. No.: 17/170,559

(22) Filed: Feb. 8, 2021

(65) Prior Publication Data

US 2021/0249158 A1 Aug. 12, 2021

Related U.S. Application Data

(60) Provisional application No. 62/972,397, filed on Feb. 10, 2020.

(51) Int. Cl.

*H01B 3/08* (2006.01)
*H01B 3/12* (2006.01)
*H01B 3/46* (2006.01)
*H01B 11/18* (2006.01)

(52) U.S. Cl.

CPC ......... *H01B 11/1856* (2013.01); *H01B 3/087* (2013.01); *H01B 3/12* (2013.01); *H01B 3/46* (2013.01); *H01B 11/1869* (2013.01); *H01B 11/1895* (2013.01)

(58) Field of Classification Search

CPC ............. H01B 3/08; H01B 3/10; H01B 7/295
See application file for complete search history.

(56) References Cited

U.S. PATENT DOCUMENTS

| | | | |
|---|---|---|---|
| 3,299,202 | A | 1/1967 | Brown |
| 3,567,846 | A | 3/1971 | Brorein et al. |
| 3,590,141 | A | 6/1971 | Mildner |
| 3,823,255 | A | 7/1974 | La Gase et al. |

(Continued)

FOREIGN PATENT DOCUMENTS

| | | |
|---|---|---|
| CN | 201421874 | 3/2010 |
| CN | 202384468 | 8/2012 |

(Continued)

OTHER PUBLICATIONS

"2-Hour Fire-Rated, Mineral Insulated Copper Sheathed Wiring Cable", Pentair, Pyrotenax System 1850, Jul. 2015, 6 pages.

(Continued)

*Primary Examiner* — Chau N Nguyen
(74) *Attorney, Agent, or Firm* — Mark P. Mathison

(57) ABSTRACT

A fire resistant corrugated coaxial cable is described that employs a high-temperature, insulating alkaline earth silicate (AES) wool dielectric. The AES wool dielectric is devoid of water as a constituent. The AES wool may be survivable under conditions of high heat, such as temperatures specified by common fire test standards (e.g., 1850° F./1010° C. for two hours). The cable is configured to maintain a relatively coaxial relation between a center conductor and an outer conductor even under aforementioned fire tests. A layer of ceramifiable silicone rubber or refractory fiber wrap can surround the outer conductor and continues to insulate it from the outside if a low-smoke zero-halogen (LSZH) jacket burns away.

24 Claims, 10 Drawing Sheets

(56) References Cited

U.S. PATENT DOCUMENTS

| | | | | |
|---|---|---|---|---|
| 3,903,354 | A | 9/1975 | Dageforde | |
| 4,391,425 | A | 7/1983 | Keep, Jr. | |
| 5,227,586 | A | 7/1993 | Beauchamp | |
| 5,262,593 | A * | 11/1993 | Madry | H01B 11/1856 174/102 P |
| 5,457,285 | A | 10/1995 | Faust et al. | |
| 5,714,421 | A * | 2/1998 | Olds | C04B 35/6224 501/36 |
| 6,049,647 | A | 4/2000 | Register et al. | |
| 6,387,518 | B1 | 5/2002 | Wolfer et al. | |
| 7,304,245 | B2 | 12/2007 | Alexander et al. | |
| 7,470,641 | B2 * | 12/2008 | Jubb | F27D 1/0006 501/36 |
| 7,538,275 | B2 | 5/2009 | Konnik et al. | |
| 7,652,090 | B2 | 1/2010 | Alexander et al. | |
| 7,875,566 | B2 * | 1/2011 | Freeman | C04B 35/6224 501/36 |
| 9,449,741 | B2 | 9/2016 | Abe et al. | |
| 9,450,352 | B2 | 9/2016 | Miyawaki | |
| 9,773,565 | B1 | 9/2017 | Yeh | |
| 9,773,585 | B1 * | 9/2017 | Rogers | H01B 7/0275 |
| 10,283,239 | B2 | 5/2019 | Rogers | |
| 10,726,974 | B1 | 7/2020 | Rogers | |
| 11,145,440 | B2 | 10/2021 | Rogers | |
| 2003/0055157 | A1 | 3/2003 | Wolfer et al. | |
| 2006/0175074 | A1 | 8/2006 | Huffman | |
| 2008/0093107 | A1 * | 4/2008 | Amigouet | C08L 23/02 174/121 A |
| 2010/0101824 | A1 | 4/2010 | Fujimoto et al. | |
| 2011/0209892 | A1 | 9/2011 | Metz et al. | |
| 2011/0247839 | A1 * | 10/2011 | Lalouch | D04H 1/4209 264/109 |
| 2013/0299211 | A1 | 11/2013 | Pope | |
| 2014/0037956 | A1 | 2/2014 | Sopory | |
| 2015/0060106 | A1 | 3/2015 | Polasky | |
| 2015/0206625 | A1 | 7/2015 | Kumada | |
| 2015/0318675 | A1 | 11/2015 | Olsson et al. | |
| 2016/0093419 | A1 | 3/2016 | Shin et al. | |
| 2018/0174710 | A1 | 6/2018 | Rogers | |
| 2020/0126690 | A1 * | 4/2020 | Sirin | H01B 7/295 |
| 2020/0211739 | A1 * | 7/2020 | Elsaadani | H01B 11/1869 |
| 2021/0233682 | A1 * | 7/2021 | Elsaadani | H01B 7/1875 |

FOREIGN PATENT DOCUMENTS

| | | |
|---|---|---|
| CN | 103753927 | 4/2014 |
| CN | 105913951 | 8/2016 |
| CN | 107768003 | 3/2018 |
| JP | 11297128 | 10/1999 |
| JP | 2012204089 A | 10/2012 |

OTHER PUBLICATIONS

"3M™ Nextel™ Ceramic Fibers and Textiles", 3M Science Applied to Life, Available at http://www.3m.com/3M/en-US/company-us/all-3m-products/-/A11-3M-Products/Chemicals-Advanced-Materials/Advanced-Ceramics/Ceramic-Fibers-and-Textiles, Nov. 9, 2016, 11 pages.

"Alsecure® Premium Multicore", Nexans Olex, Alsecure® Premium Multicore Ceramifiable®, Available at http://www.olex.com.au, Nov. 19, 2016, 2 pages.

"Ceram Polimerik—The World's Hottest Company in Fire Protection Technology", Global Intelligence of Fire Protection Industry Worldwide, Market Analysis of Projects and Developments, Fire Prevention—Active and Passive Fire Protection, Press Room Available at http://hkc22.com/fireprotectionindustry_pressroom_ceram_polymerik.html, Accessed from Internet on Nov. 18, 2016, 3 pages.

"Ceramifiable Silicone Rubber Compound for Fire Resistant Cable", Anpin Silicone Material Co., Ltd., Available at http://anpin.en.explaza.net/ceramifiable-silicone-rubber-compund-for--94686-3590090.html, Accessed from Internet on Sep. 26, 2016, 3 pages.

"Fire-Resistant Cables", Fanton, 2007-2008, 1 page.

"Korean Ceramifiable® Cables That Can Take the Heat", Nexans, Available at http://www.nexans.com/eservice/navigation/NavigationPublicationOnly.nx?forPrint=true&publicationId=-33641, Accessed from Internet on Nov. 18, 2016, 1 page.

Di et al., "A Novel EVA Composite With Simultaneous Flame Retardation and Ceramifiable Capacity", RSC Advances, vol. 5, Issue 83, 2015, 2 pages.

Wilson et al., "Circuit Integrity Cable Re-Examined", Available Online At: http://www.csemag.com/industry-new/codes-and-standards-updates/single-article/circuit-integrity-cable-reexamined/09dde6e6e9f8cc2e5c90c024f3825d3b.html, Mar. 1, 2002, 2 pages.

Johnson , "Foam Heliax—A new foam coaxial cable", IRE Transactions on Vehicular Communications, vol. VC-11, No. 1, Aug. 1962, pp. 1-3.

* cited by examiner

FIRE RESISTANT CORRUGATED COAXIAL CABLE

CROSS-REFERENCES TO RELATED APPLICATIONS

This application claims the benefit of U.S. Provisional Application No. 62/972,397, filed Feb. 10, 2020, which is heresby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present application generally relates to communication cables or conductors, including coaxial cables constructed with cellular and other structure between the conductors. Specifically, the application is related to fire-resistant coaxial cables with a corrugated outer conductor and a high-temperature insulation wool dielectric.

2. Description of the Related Art

Since the Sep. 11, 2001 attacks on the World Trade Center and Pentagon, there has been a world-wide emphasis on improving communications during emergencies. In the first minutes of an emergency, communication among civilians and first responders is often through wireless communication devices, such as cellular telephones. While wireless signals, being electromagnetic radiation typically in the radio frequency (RF) range, are impervious to damage and do not depend on wires for transmission, the wireless signals depend on other infrastructure to communicate. This infrastructure includes antennas, switching equipment, towers, repeaters—and wires.

Ground zero of a disaster, man-made or natural, is often localized to a particular geographic area. At least some local cell towers may be operational. But cell phones within large buildings often do not connect directly with cell towers. Such buildings, as well as shopping centers and stadiums, may have too many obstacles and reflections for conventional cell phone-to-tower connections. For example, the metal reflective film applied to glass facades of commercial buildings prevents transmission of RF energy outside the building. Or the buildings may simply be too large for RF signals to reach a nearby cell tower, such as is the case with stadiums.

A cellular distributed antenna system (DAS) is often employed within buildings and other facilities in order to facilitate transmission of signals between occupants' cell phones and local cell towers. Multiple antennas are located throughout the facility, such as on each floor. Signals to and from the distributed antennas are routed—by cable—through a central processing rack in the basement or on the first or top floor. One or more cables connects the central processing rack to an outside antenna that is pointed or otherwise configured to optimally communicate with a local cell tower. The outside antenna is often located on a building's roof.

An Emergency Responder Radio Coverage System (ERRCS) DAS may also be employed within facilities. An ERRCS DAS boosts radio signals for firemen, policemen, and other first responders, similarly to a cellular DAS.

If there is an emergency in the building, a DAS may be critical for communications. Firefighters and policemen need to communicate with one another while responding. Users should be able to communicate with the outside as well. It may be especially unnerving for users to have their otherwise-normally-operational cell phones experience an outage during a building emergency.

It is for these and other reasons that building fire codes require DASes to meet certain survivability standards. For example, building fire codes sometimes dictate that communication cables connecting the DAS's antennas to the central processing/head-end rack and communication cables running from the rack to the outside antenna maintain operation at 1010° C. (1850° F.) temperatures for two hours. This standard can be found among the NFPA 72 (National Fire Alarm and Signaling Code), ICC IFC 510 (International Fire Code), and NFPA 1221 (Standard for the Installation, Maintenance, and Use of Emergency Services Communications Systems) codes.

There is a need in the art for a cable that is survivable with minimal signal loss.

BRIEF SUMMARY

Generally, a coaxial cable is described that has an alkaline earth silicate (AES) wool dielectric layer between an inner, center conductor and a coaxial, corrugated outer conductor, with a refractory layer outside the corrugated conductor. The AES wool is bereft of water, which degrades RF signals. When subjected to temperatures exceeding 1010° C. (1850° F.), the AES wool dielectric remains fire resistant. In the event any other portion of the dielectric burns away at temperatures exceeding 1010° C. (1850° F.), the AES wool dielectric maintains the center conductor relatively centered and coaxial to the outer conductor.

Embodiments include a fire resistant corrugated coaxial cable apparatus. The apparatus can include a center conductor, an AES wool dielectric, with the AES wool dielectric surrounding the center conductor and substantially devoid of chemically bound or free water, a corrugated outer conductor surrounding the AES wool dielectric, a ceramifiable silicone rubber inner jacket or a ceramic fiber wrap inner jacket surrounding the corrugated outer conductor, and a smooth outer jacket surrounding the inner jacket.

In embodiments, the ceramic fiber wrap inner jacket can be braided.

In embodiments, the AES wool can have fibers with a weight percentage of: (a) $58.5\%<SiO_2<68.9\%$; (b) $18.1\%<CaO<40.5\%$; (c) $0.11\%<MgO<16.4\%$; (d) $0<Al_2O_3<1.5\%$; (e) $0<ZrO_2<4.5\%$; (f) $0<B_2O_3<8.41\%$; (g) $0<Fe_2O_3<2.9\%$; (h) $0<Na_2O<2.6\%$; (i) $0<TiO_2<10\%$; wherein the total quantity of $Al_2O_3$, $ZrO_2$, $TiO_2$, $B_2O_3$ and iron oxides does not exceed 10 wt % based upon the total fiber composition.

In embodiments, the AES wool can have fibers with a composition weight percentage of: $72\%<SiO_2<86\%$; $0<MgO<10\%$; $14\%<CaO<28\%$; $Al_2O_3<2\%$; $ZrO_2<3\%$; $B_2O_3<5\%$; $P_2O_5<5\%$; $95\%<SiO_2+CaO+MgO+Al_2O_3+$ $ZrO_2+B_2O_3+P_2O_5$. The composition may additionally have a composition weight such that $72\%<SiO_2+ZrO_2+B_2O_3+5*P_2O_5$.

In embodiments, the AES wool can have fibers with a composition weight percentage of: $65\%<SiO_2<86\%$; $MgO<10\%$; $13.5\%<CaO<27.5\%$; $Al_2O_3<2\%$; $ZrO_2<3\%$; $B_2O_3<5\%$; $P_2O_5<5\%$; $72\%<SiO_2+ZrO_2+B_2O_3+5*P_2O_5$; $95\%<SiO_2+CaO+MgO+Al_2O_3+ZrO_2+B_2O_3+P_2O_5$; $0.2\%<M_2O<1.5\%$; in which M is alkali metal and which at least 75 mol % of the alkali metal is potassium and soluble in physiological saline solution to give non-toxic dissolved components.

In some embodiments, the AES wool can have fibers with a composition weight percentage of: $65\%<SiO_2<86\%$; $MgO<10\%$; $14\%<CaO<28\%$; $Al_2O_3<2\%$; $ZrO_2<3\%$; $B_2O_3<5\%$; $P_2O_5<5\%$; $72\%<SiO_2+ZrO_2+B_2O_3+5*P_2O_5$; $95\%<SiO_2+CaO+MgO+Al_2O_3+ZrO_2+B_2O_3+P_2O_5$.

In some embodiments, the outer jacket is made from a low-smoke zero halogen.

Embodiments include a method of manufacturing a fire resistant coaxial cable. The method includes surrounding a center conductor with an AES wool dielectric, wherein the AES wool dielectric is substantially devoid of chemically bound or free water, encasing the AES wool dielectric with an outer conductor, and insulating the outer conductor with a refractory insulating jacket.

The insulating can include wrapping the outer conductor with a ceramic fiber wrap inner jacket. The ceramic fiber wrap inner jacket can include a glass substrate, a multi-ply tape, and/or an AES wool inner jacket. The insulating can include enclosing the refractory insulating jacket with a low smoke zero halogen (LSZH) outer jacket.

Embodiments include a method of installing a fire resistant coaxial cable, the method including providing a coaxial cable having a center conductor surrounded by an alkaline earth silicate (AES) wool dielectric, which is surrounded by an outer conductor, which is surrounded by a ceramifiable silicone rubber inner jacket or a ceramic fiber wrap inner jacket, which is surrounded by a low smoke zero halogen outer jacket, wherein the AES wool dielectric substantially devoid of chemically bound or free water; pulling or pushing the coaxial cable through a conduit; and connecting the coaxial cable to an antenna of a distributed antenna system Embodiments include a method of testing a fire resistant coaxial cable, the method including providing a coaxial cable having a center conductor surrounded by a ceramifiable silicone rubber dielectric or a ceramic fiber wrap dielectric, which is surrounded by an outer conductor, which is surrounded by a ceramifiable silicone rubber inner jacket or a ceramic fiber wrap inner jacket, which is surrounded by a low smoke zero halogen outer jacket. The method includes subjecting the coaxial cable to 1010° C. heat, maintaining a protective layer around the outer conductor after the subjecting the coaxial cable to heat, wherein the protective layer is the ceramifiable silicone rubber inner jacket or the ceramic fiber wrap inner jacket, burning at least a portion of the outer jacket from the cable, and passing an electric voltage or current signal through the coaxial cable after the ceramifying and the burning.

The maintaining of the protective layer can include ceramifying the ceramifiable silicone rubber inner jacket.

The ceramifying of the ceramifiable silicone rubber inner jacket can include burning away a polysiloxane matrix and melting inorganic flux particles such that the flux particles connect between refractory filler particles.

The method can include resting the coaxial cable on a metal surface, wherein the burning of the outer jacket exposes the ceramifiable silicone rubber inner jacket or the ceramic fiber wrap inner jacket to the metal surface, the ceramifiable silicone rubber inner jacket or the ceramic fiber wrap inner jacket preventing the outer conductor from contacting the metal surface.

DETAILED DESCRIPTION

Figure 1:
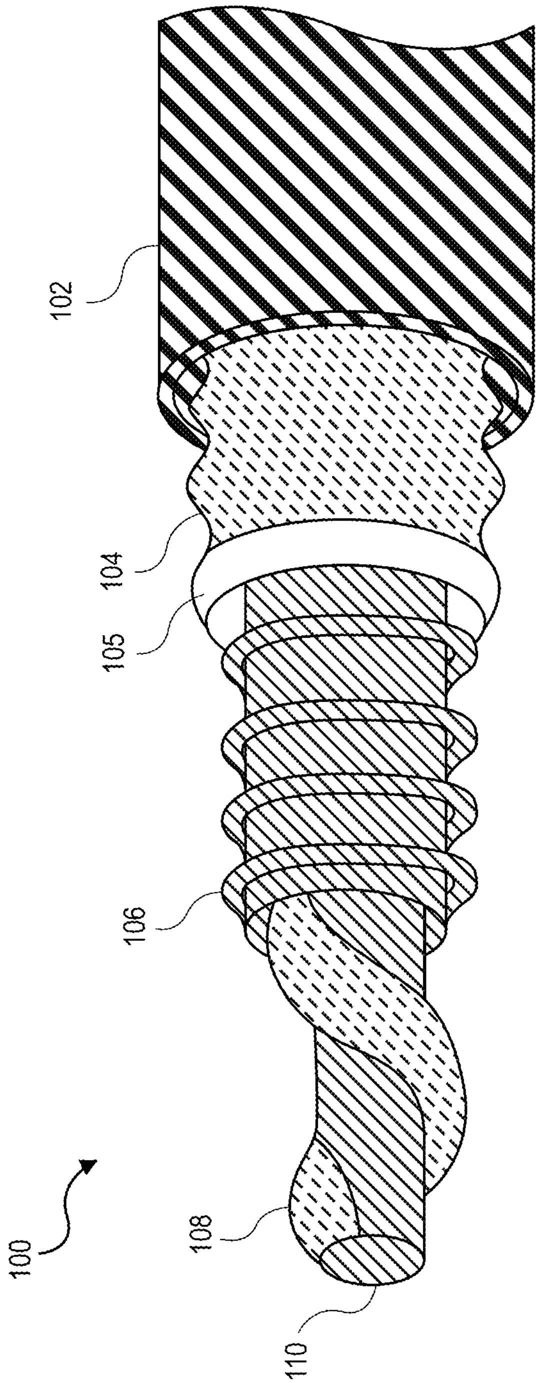
FIG. 1 is a cut-away perspective view of a corrugated coaxial cable in accordance with an embodiment.

Fire resistant corrugated coaxial cable is described. Some embodiments of the cable can survive two hours in fire conditions of 1010° C. (1850° F.), which is a common fire rating, maintaining relative concentricity of a center conductor to allow for operation in an emergency.

In the prior art, high temperature coaxial cable that uses an endothermic dielectric wrap is available on the market as AirCell® RediComm™ High Temperature Plenum cable, product number APH012J50, from Trilogy Communications, Inc. of Mississippi, U.S.A. Its dielectric has chemically bound water as a constituent material. The presence of water helps cool the cable at high temperatures. That is, the phase change of chemically bound water from liquid to gas takes heat energy away from the cable, thus the "endothermic" designation. Yet, while initially cooling, the limited amount of chemically-bound water in the dielectric is not enough to withstand 2-hour survivability tests for fire code compliance.

High-temperature insulating wool with varying water content exists as a form of insulation across a spectrum of uses, such as fire blankets, because the trapped water upon phase change from liquid and release as steam tends to cool the surrounding wool. However, even these standard high-temperature, insulating gives way when subjected to the survivability standards that DASes are expected to meet.

The inventor recognized that use of an alkaline earth silicate (AES) wool without water as a constituent gives a lower dielectric loss in day-to-day operation of the cable while allowing the cable to be compliant with building codes for distributed antenna systems (DAS) without the need for fire-protective soffits, conduits or other expensive shielding.

An alkaline earth silicate, or AES wool includes a mineral wool suitable for high temperature applications. Specifically, AES wool may have alkaline earth minerals or glass fibers produced from a combination of: silicon dioxide ($SiO_2$), calcium oxide (CaO), magnesium oxide (MgO), aluminum oxide ($Al_2O_3$), zirconium dioxide ($ZrO_2$), boron oxide ($B_2O_3$), iron (III) oxide ($Fe_2O_3$), sodium oxide ($Na_2O$), titanium (IV) oxide ($TiO_2$), or other glass fibers. AES wool may also have phosphorous pentoxide ($P_2O_5$). AES wool may have biosoluble properties so as to allow one's body to expel it after exposure. AES wool may be devoid of either trapped or free water as a constituent.

Examples of AES wool are described in: U.S. Pat. Nos. 5,714,421; 7,651,965; 7,470,641; and 7,875,566; and European Pat. No. 1,544,177. Commercially available examples of AES wool include but are not limited to SUPERWOOL® XTRA™.

A "ceramifiable" material includes a material that turns from a flexible material into a ceramic when exposed to high temperatures, such as over 425° C., 482° C., 1010° C., or as otherwise known in the art. The material can be a composition of component materials that have different melting ranges. The lowest-melting temperature component materials may melt at 350° C. Between 425° C. and 482° C., other component materials of the material my devitrify, passing from a glass-like state into a crystalline state. Additives can bond refractory fillers together, forming a porous ceramic material. A material configured to convert from a resilient elastomer to a porous ceramic when heated above 425° C. can include initial, partial, or full conversion to ceramic when air temperature surrounding is heated above 425° C.

An example ceramifiable polymer may be the peroxidically crosslinking or condensation-crosslinking polymer described in U.S. Pat. No. 6,387,518.

A "ceramifiable silicone rubber" includes silicone polymer (polysiloxane) with additives that cause the material to turn into a fire-resistant ceramic in high temperature fire conditions, or as otherwise known in the art. This may include peroxide crosslinking or condensation-crosslinking high consistency silicone rubber. A silicone polymer matrix can include low-melting point inorganic flux particles and refractory filler particles in a polysiloxane matrix. Example products include, but are not limited to: Ceramifiable Silicone Rubber Compound RCS-821 manufactured by Shenzhen Anpin Silicone Material Col, Ltd. of Guangdong, China; ELASTOSIL® R 502/75 compound manufactured by Wacker-Chemie GmbH of Munich, Germany; and XIAMETER® RBC-7160-70 compound manufactured by Dow Corning Corporation of Midland, Michigan, United States of America.

Use of a ceramifiable silicone rubber can be seen and is described in U.S. Pat. Nos. 9,773,585 and 10,726,974, both of which are incorporated in their entirety by reference.

A "ceramic fiber wrap" includes a textile that includes microscopic ceramic fibers and fillers that maintain structural integrity at high temperatures. Example products include NEXTEL© ceramic fibers and textiles manufactured by 3M Corporation of Saint Paul, Minnesota, United States of America. 3M NEXTEL© textiles include aluminoborosilicate, aluminosilica, and alumina (aluminum oxide $Al_2O_3$) fibers with diameters ranging from 7 microns to 13 microns. Per the World Health Organization (WHO), fiber diameters above 3 microns (with length greater than 5 microns with a length-to-diameter ration greater than 3:1) are not considered respirable.

In some embodiments, the ceramic fiber wrap can include a glass substrate. The ceramic fiber wrap, for example, can be a multi-ply tape with a glass substrate and a layer of a phyllosilicate tape. An example product includes EIS® mica tape, manufactured by Isovolta. Mica tape manufactured by Isovolta includes calcined muscovite mica paper reinforced on one side with a glass cloth.

A "refractory" material includes non-metallic material having those chemical and physical properties that make them applicable for structures, or as components of systems, that are exposed to environments above 1,000° F. (811 K; 538° C.) (ASTM C71), or as otherwise known in the art.

A "low smoke zero halogen" or "low smoke free of halogen" (LSZH or LSOH or LSOH or LSFH or OHLS) is a material classification typically used for cable jacketing in the wire and cable industry. LSZH cable jacketing is composed of thermoplastic or thermoset compounds that emit limited smoke and no halogen when exposed to high sources of heat.

A "radial thickness" includes a layer thickness, or as otherwise known in the art. On a circular cross-sectioned cable, the radial thickness is the distance along a radial line from one point to another point. This is distinguished from a tangential, secant, axial, or other distance.

MYLAR® polyester film is trade name of E. I. du Pont de Nemours and Company, Wilmington, Delaware, U.S.A., for a biaxially-oriented polyethylene terephthalate (boPET) product.

Being "devoid or free" of water or another material includes having less than 10%, 9%, 8%, 7%, 6%, 5%, 4%, 3%, 2%, 1%, 0.5%, 0.1%, 0.05%, or 0.001% of the material within the item that is devoid or free of it, or as otherwise known in the art.

FIG. 1 shows a cutaway perspective view of a fire resistant corrugated coaxial cable 100 in accordance with embodiments. The exemplary cable essentially has a round cross-section and is radially symmetric around an axial centerline. The coaxial cable has a center conductor 110. Radially surrounding the center conductor 110 is an AES wool dielectric layer 108. Radially surrounding the AES wool dielectric layer 108 is an outer conductor 106. Radially surrounding the outer conductor 106 is an overwrap layer 104. Radially surrounding the overwrap layer 104 is an outer jacket 102.

Here, the center conductor 110 is a solid wire running the length of the coaxial cable 100. However, the center conductor 110 may be a single solid wire or composed of several smaller individual wires. In an embodiment, the center conductor may be made of nineteen strands of individual wire that are bundled and twisted together. Each individual wire may be bare, nickel-plated copper, or otherwise modified.

The AES wool dielectric layer 108 serves as a dielectric layer, separating the center conductor 110 and the outer conductor 106. The AES wool dielectric layer 108 may be devoid of trapped or free water as a constituent. The AES wool dielectric layer 108 may be sufficiently heat resistant, such that, in the event of a fire, the AES wool dielectric layer 108 maintains a spacing between the center conductor and the outer conductor, allowing for signal to continue to propagate down the coaxial cable. The AES wool dielectric layer 108 may be heat resistant to withstand temperatures of 1010° C. (1850° F.) for over two hours.

In some embodiments, the AES wool dielectric layer wraps around the center conductor in a periodic manner, such that portions of the center conductor are not covered by AES wool. In other embodiments, the AES wool dielectric layer may be a uniform sheet to uniformly wrap around the center conductor.

The AES wool dielectric 108 may have fibers with varying composition weights. For example, in some embodiments, the composition weight percentages may be (a) $58.5\%<SiO_2<68.9\%$; (b) $18.1\%<CaO<40.5\%$; (c) $0.11\%<MgO<16.4\%$; (d) $0<Al_2O_3<1.5\%$; (e)

$0<ZrO_2<4.5\%$; (f) $0<B_2O_3<8.41\%$; (g) $0<Fe_2O_3<2.9\%$; (h) $0<Na_2O<2.6\%$; (i) $0<TiO_2<10\%$; wherein the total quantity of $Al_2O_3$, $ZrO_2$, $TiO_2$, $B_2O_3$ and iron oxides does not exceed 10 weight % based upon the total fiber composition.

In other embodiments, the AES wool fibers can have a composition weight percentage of: $72\%<SiO_2<86\%$; $0<MgO<10\%$; $14\%<CaO<28\%$; $Al_2O_3<2\%$; $ZrO_2<3\%$; $B_2O_3<5\%$; $P_2O_5<5\%$; $95\%<SiO_2+CaO+MgO+Al_2O_3+ZrO_2+B_2O_3+P_2O_5$. The composition may additionally have a composition weight such that $72\%<SiO_2+ZrO_2+B_2O_3+5*P_2O_5$ In other embodiments, the AES wool fibers can have a composition weight percentage of: $65\%<SiO_2<86\%$; $MgO<10\%$; $13.5\%<CaO<27.5\%$; $Al_2O_3<2\%$; $ZrO_2<3\%$; $B_2O_3<5\%$; $P_2O_5<5\%$; $72\%<SiO_2+ZrO_2+B_2O_3+5*P_2O_5$; $95\%<SiO_2+CaO+MgO+Al_2O_3+ZrO_2+B_2O_3+P_2O_5$; $0.2\%<M_2O<1.5\%$; in which M is alkali metal and which at least 75 mol % of the alkali metal is potassium and soluble in physiological saline solution to give non-toxic dissolved components.

In other embodiments, the AES wool fibers can have a composition weight percentage of: $65\%<SiO_2<86\%$; $MgO<10\%$; $14\%<CaO<28\%$; $Al_2O_3<2\%$; $ZrO_2<3\%$; $B_2O_3<5\%$; $P_2O_5<5\%$; $72\%<SiO_2+ZrO_2+B_2O_3+5*P_2O_5$; $95\%<SiO_2+CaO+MgO+Al_2O_3+ZrO_2+B_2O_3+P_2O_5$.

The outer conductor 106 is a corrugated metallic shielding surrounding the AES wool dielectric. The corrugated metal may be a 0.25 inch solid copper corrugated metal or otherwise. The corrugation of the outer conductor 106 can be helical, such that a cross section is not symmetric along axial planes. In other embodiments, the outer conductor 106 may be a metallic wrap.

The overwrap layer 104 is a ceramifiable silicone rubber. In the event of a fire, the overwrap layer 104 may solidify and form a protective, firm layer surrounding the outer conductor, thereby preventing a short in the event the coaxial cable is resting on a metallic surface and the outer jacket burns away. In other embodiments the overwrap layer 104 may be a fiber wrap or otherwise.

In embodiments where the overwrap layer 104 is a fiber wrap, the overwrap layer 104 can include glass, such as a glass substrate, glass or ceramic particles, or any other suitable insulating layer. In an example, a suitable fiber wrap may be a multi-ply tape 105 with mica as a constituent mineral within the tape. In some embodiments, the fiber wrap may include AES wool as an AES wool inner jacket.

The outer jacket 102 is a low-smoke zero-halogen jacket, which protects pliable silicone rubber of the inner jacket and slides more easily through walls and conduits. The outer jacket 102 can be made of cross-linked, irradiated polyolefin and can be colored in order to stand out from other non-emergency cables. Other materials can be used for an outer jacket, such as polyvinyl chloride (PVC), thermoplastic elastomers, thermoset polyolefins, or other cable jacketing materials.

Figure 2A:
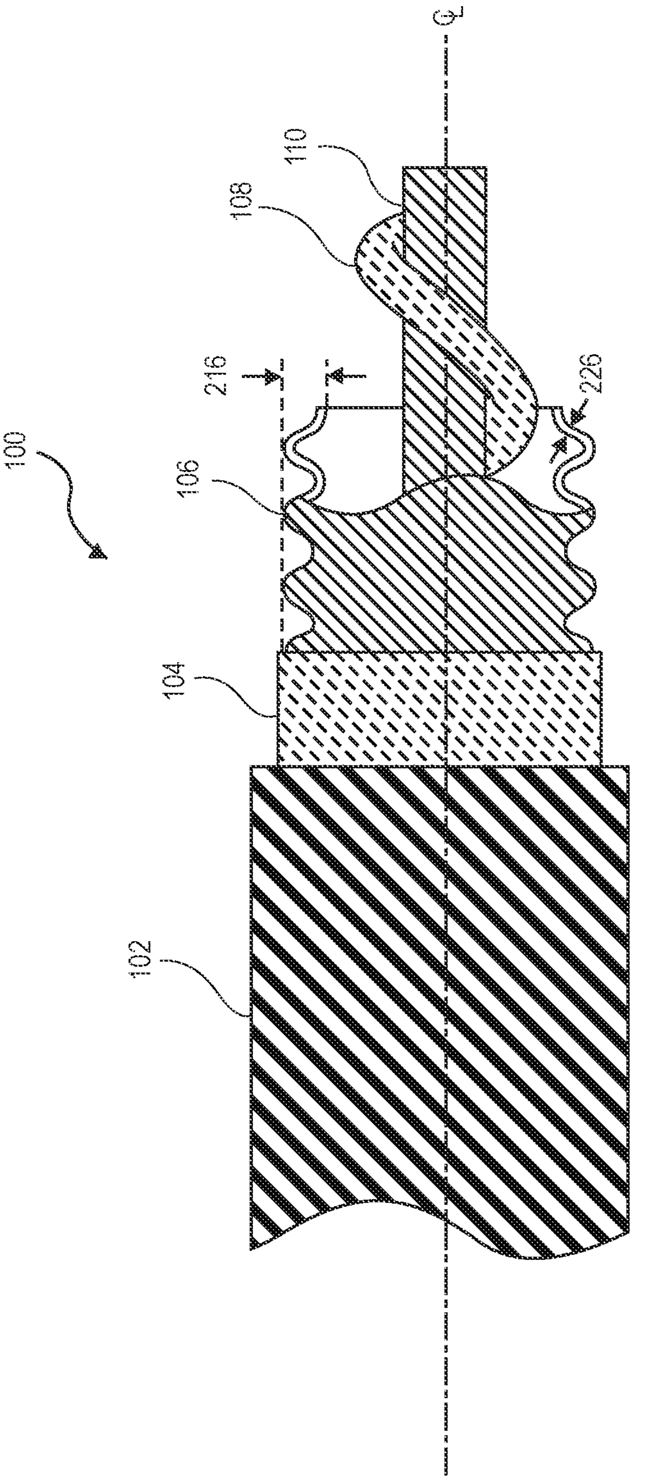
FIG. 2A is a cut-away side view of the corrugated coaxial cable of FIG. 1.
Figure 2B:
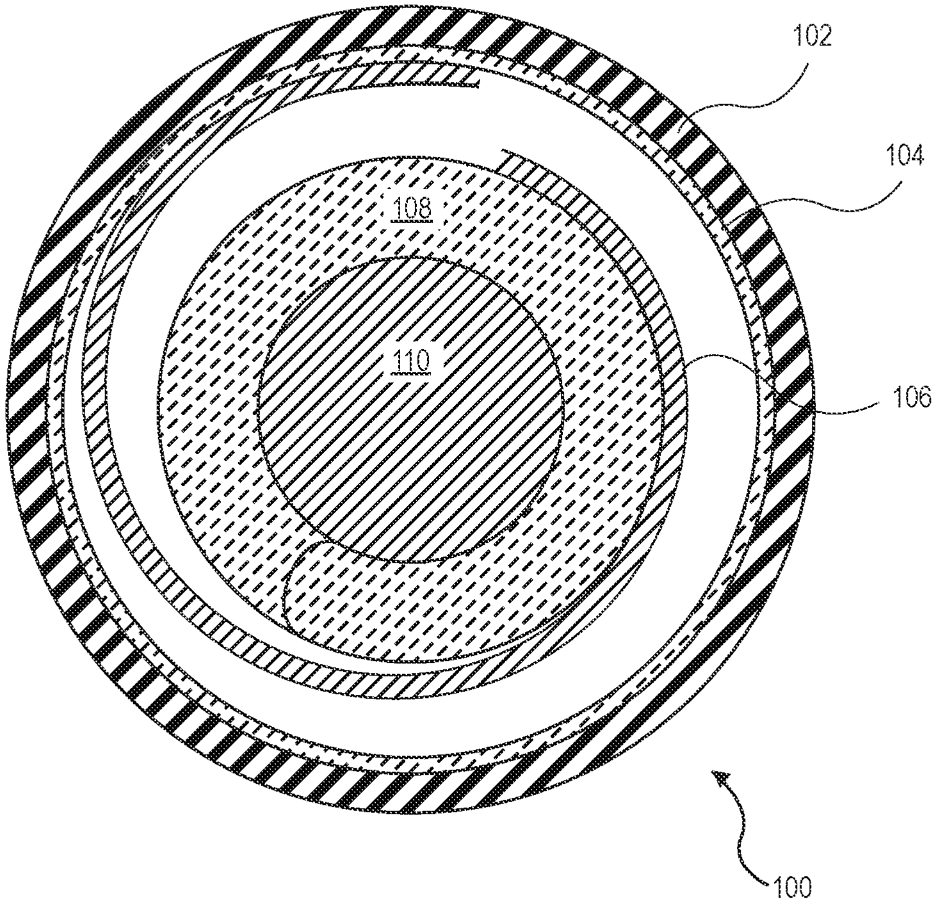
FIG. 2B is a cross-section of the corrugated coaxial cable of FIG. 1.
Figure 2C:
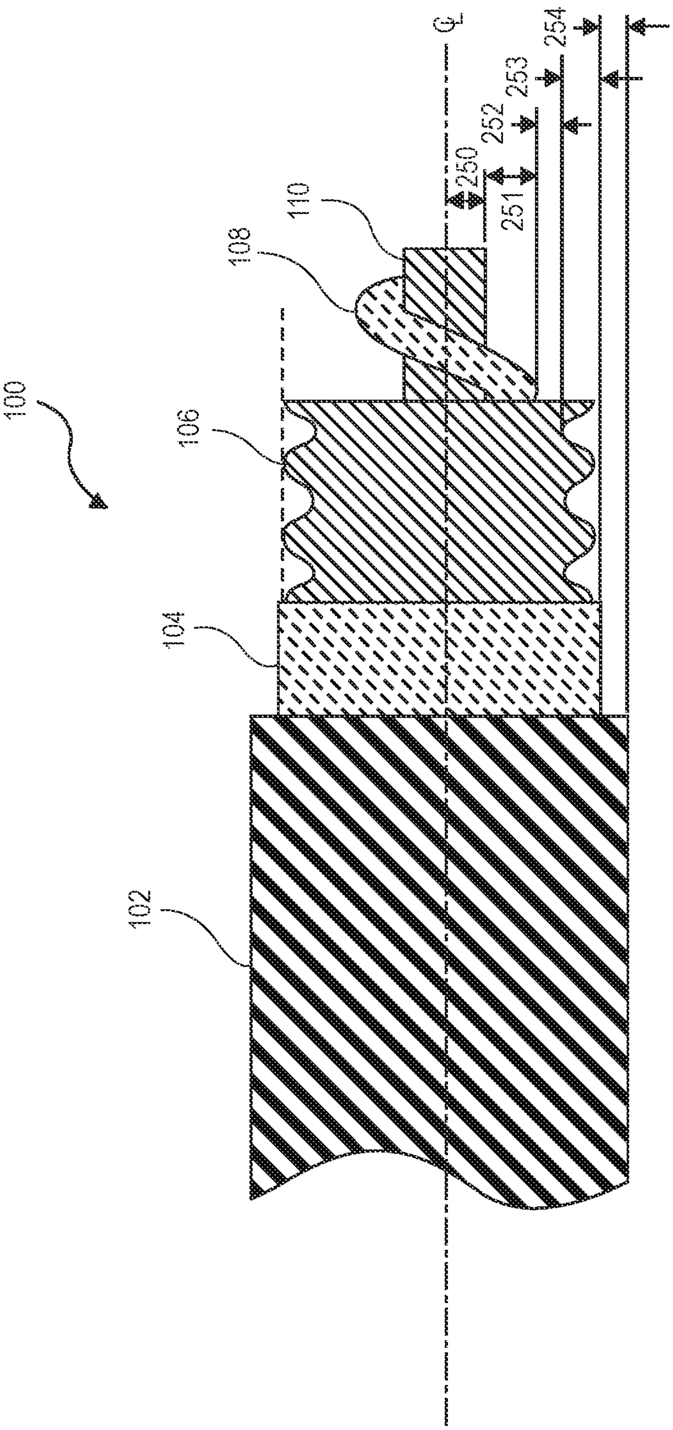
FIG. 2C is a cut-away side view of the corrugated coaxial cable of FIG. 1 showing radial lengths.

FIG. 2A-2C show views of the corrugated coaxial cable 100 of FIG. 1. The coaxial cable 100 can be run in buildings between DAS equipment and meet applicable fire codes.

FIG. 2A shows a cutaway side view of the coaxial cable 100. As can be seen from the cutaway side view, the outer conductor 106 can have a conductor wall thickness 226 and a layer thickness 216.

FIG. 2B shows a cross-section of a fire resistant corrugated coaxial cable of FIG. 1. As shown in the cross section, the center conductor 110 can be relatively coaxial to the outer conductor. As the outer conductor 106 is corrugated helically, the cross section is not exactly symmetric along axial planes. Even in the event of fire, the AES wool layer 108 can maintain a relative concentricity between the center conductor 110 and the outer conductor 106, without burning away.

FIG. 2C diagrams radial or layer thickness dimensions. Central conductor radius 250 is the radius (i.e., half the diameter) of center conductor 110. Dielectric layer thickness 251 is the thickness of the AES wool dielectric layer 108. Outer conductor thickness 252 is the thickness of the outer conductor 106. Overwrap layer thickness 253 is the thickness of overwrap layer 104. And outer jacket thickness 254 is the thickness of outer jacket 102.

In embodiments, the components of the figure may have different radial thicknesses than shown, as suitable for a particular need or function. For example, the AES wool dielectric layer 108 may be smaller to obtain a different dielectric constant. The outer jacket 102 may be thicker to provide a more secure cable for routing through walls. The outer wrap layer 104 may be thinner to provide for a smaller coaxial cable, while still maintaining the dielectric spacing between center conductor 110 and outer conductor 106.

Figure 3:
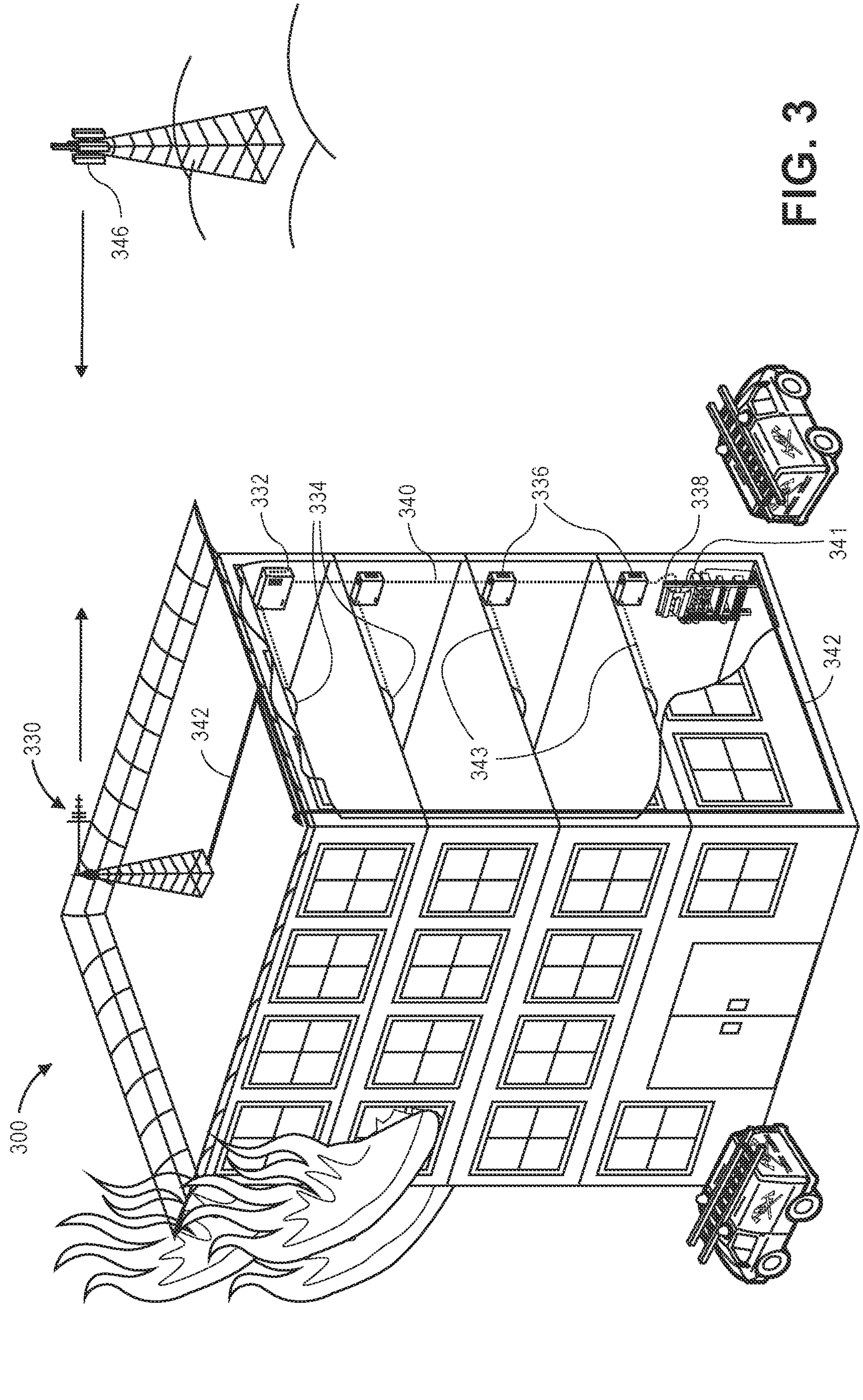
FIG. 3 is an illustration of installed cables in a building distributed antenna system in accordance with an embodiment.

FIG. 3 is an illustration of installed cables in a building distributed antenna system in accordance with an embodiment.

Building 300 has a cellular distributed antenna system (DAS) and/or Emergency Responder Radio Coverage System (ERRCS) DAS installed. A fire resistant coax cable as described above has been pulled or pushed through conduit and affixed inside and outside of the building, connecting to antennae and other systems.

Head-end rack 338 has been installed in an equipment room on the ground floor of building 300. Within head-end rack 338 is housed an optical master unit and other rack-mounted devices. Fiber optic cable 340 connects the head-end rack 338 to remote access units, including optical signal splitters 336 on each floor and remote access unit 332 on the top floor. Optical signal splitters 336 and remote access unit 332 provide the functions of converting and amplifying optical to electrical signals and back again for their respective floor's antenna units. Signal splitters 336 pull off and repeat optical signals from optical cables 340.

On each floor are indoor antennas 334 that wirelessly connect with users' cellular telephones. Antennae 334 are connected to optical signal splitters 336 and remote access unit 332 by coax cables 343, in accordance with an embodiment.

Coax cables 343 are fire resistant in accordance with embodiments herein. Coax cables 343 can maintain operation for over two hours at high temperatures. Therefore, building codes may not require coax cable 343 to be shielded from open air where fire can occur. That is, when using this cable, no additional drywall soffits, fire proof conduit, or other expensive structures may be needed to comply with building codes.

Within the head-end rack 338, fire resistant coax cable 341 can connect different rack-mounted devices. Although the equipment room in which head-end rack is situated may be fire proof, this additional cabling may incrementally harden the system to fire damage.

Fire resistant coax cable 342 runs from head-end rack 338 up the side of the building to roof mounted donor antenna 330. Donor antenna 330 is pointed at local cell tower 346 for an optimal signal.

In operation, communications from end users' cell phones goes to indoor antennae 334 and are then fed to optical splitters 336 through fire resistant coax cables 343. Fiber optic cables 340 bring the communications signals to the head end unit on the ground floor, which then sends the signals through fire resistant coax cable 342 to the roof. At the roof, donor antenna 330 sends the signals from coax cable 342 to cell tower 346. Opposite direction communication signals follow a reverse path.

During a building fire, explosion, or other emergency, coax cables 343, 342, and 341 may be exposed to an inferno of high temperatures. The low smoke zero halogen jacket may burn away. Yet while the insulation of other wires may burn and sublimate and allow their conductors to short out, an embodiment's AES wool surrounding the outer conductor largely maintains its form, if not strength and structural integrity. Moreover, the AES wool being devoid of chemically bound or free water allows the AES wool to withstand heat for extended periods of time, at or beyond those specified in fire survivability tests. In maintaining its form, the AES wool does not allow the outer conductor of the coax to electrically short against metal conduit or other wires. Thus, even in conditions of fire, the AES wool maintains the dielectric spacing between the center conductor and the outer conductor. The spacing it maintains is enough for the coaxial cable to still get signal out to first responders. At least until first responders can rescue victims and put out the blaze, their communications can depend on the wires.

After the fire is out, the coax cables may be replaced.

Figure 4:
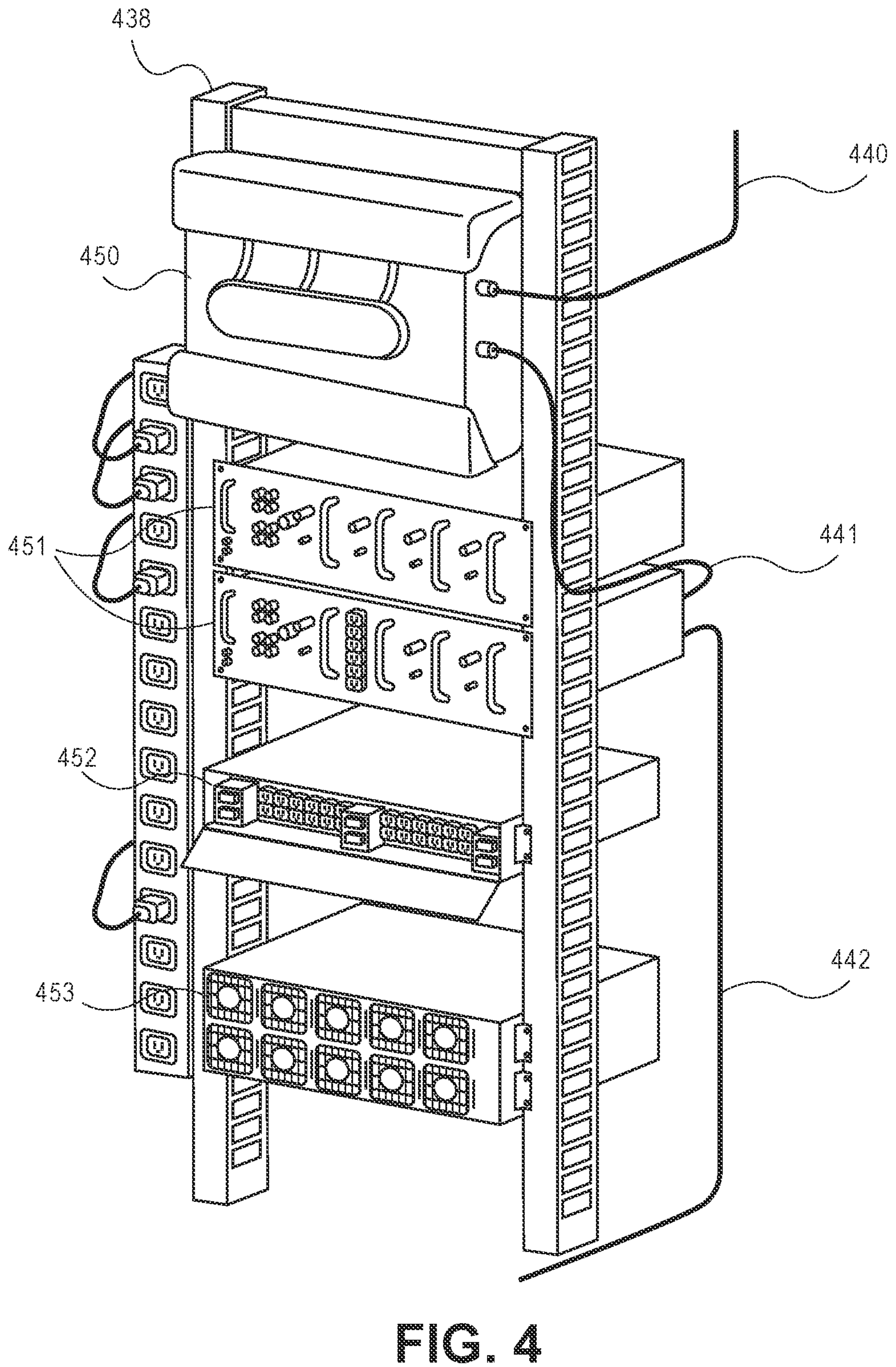
FIG. 4 is an illustration of a central processing rack in accordance with an embodiment.

FIG. 4 illustrates of a central processing rack 438 in accordance with an embodiment. Fiber optic cable 440 extends from optical master unit (OMU) 450 to the DAS field (of indoor antennae). Bi-directional amplifier (BDA) 451 is connected to OMU 450 by fire resistant coax cable 441. Fire resistant coax cable 442 connects BDA 451 to the roof antenna. Uninterruptable power supply (UPS) 452 maintains battery power when power is cut. Power supply 453 supplies electricity during normal, day-to-day operation.

Figure 5:
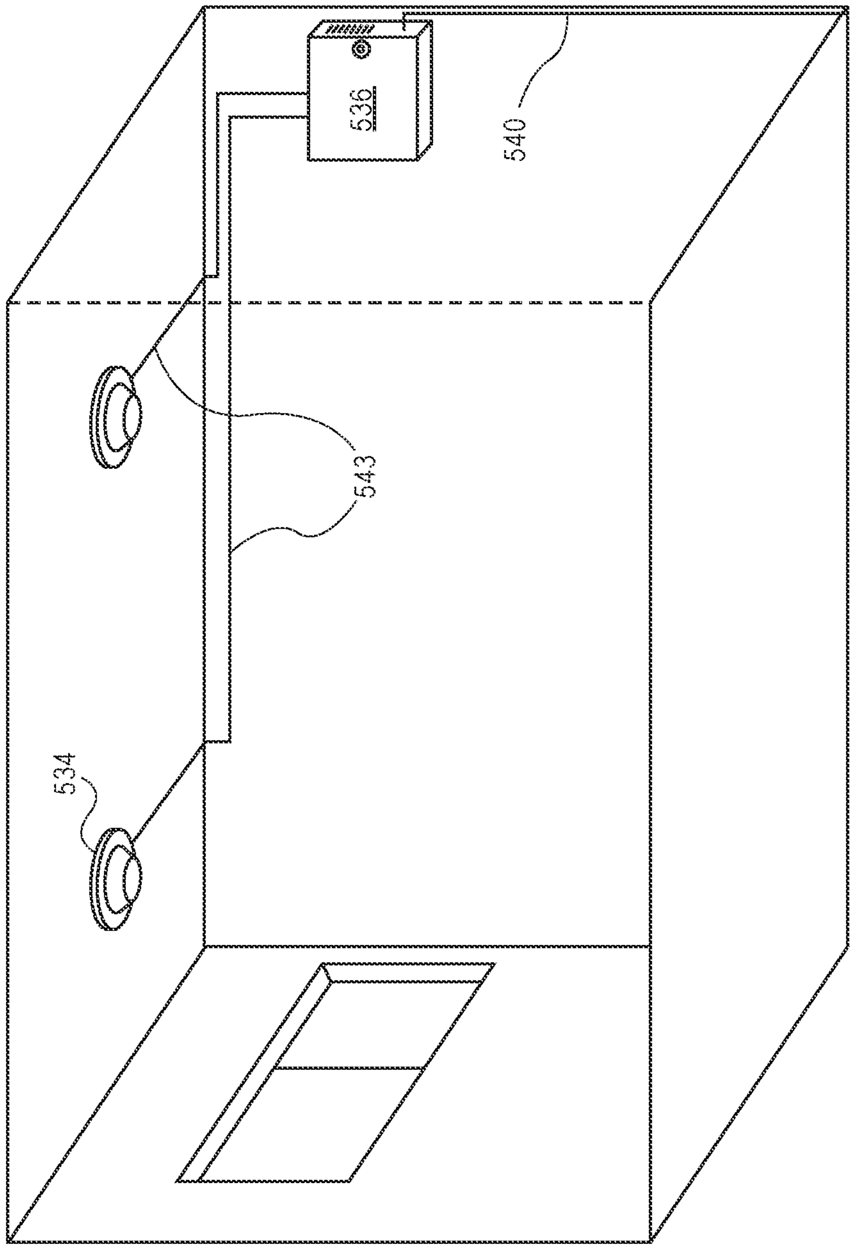
FIG. 5 is an illustration of coaxial cables connecting distributed antennas to an antenna tap in accordance with an embodiment.

FIG. 5 illustrates fire resistant coax cables connecting distributed antennas to an antenna tap in accordance with an embodiment. Note that the cable may run on the ceiling where the heat may be most intense during a fire. They may be within a false ceiling. Indoor antennae 534 are connected with optical splitter 536 via fire resistant coax cables 543. Fiber optic cable 540 connects optical splitter 536 with the head-end unit.

Figure 6:
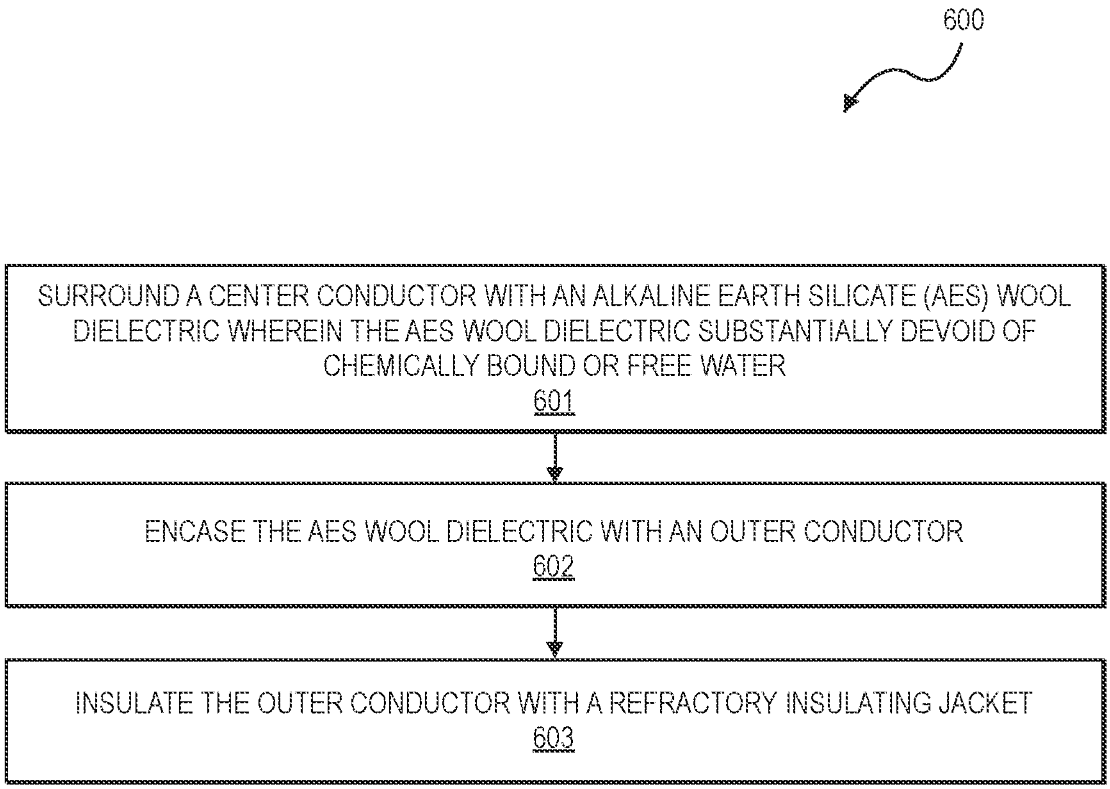
FIG. 6 is a flowchart in accordance with an embodiment.

FIG. 6 is a flowchart of a process 600 in accordance with an embodiment. In operation 601, a center conductor is surrounded with an AES wool dielectric, wherein the AES wool dielectric is substantially devoid of chemically bound or free water. In operation 602, the AES wool is encased with an outer conductor. In operation 603, the outer conductor is insulated with a refractory insulating jacket.

Figure 7:
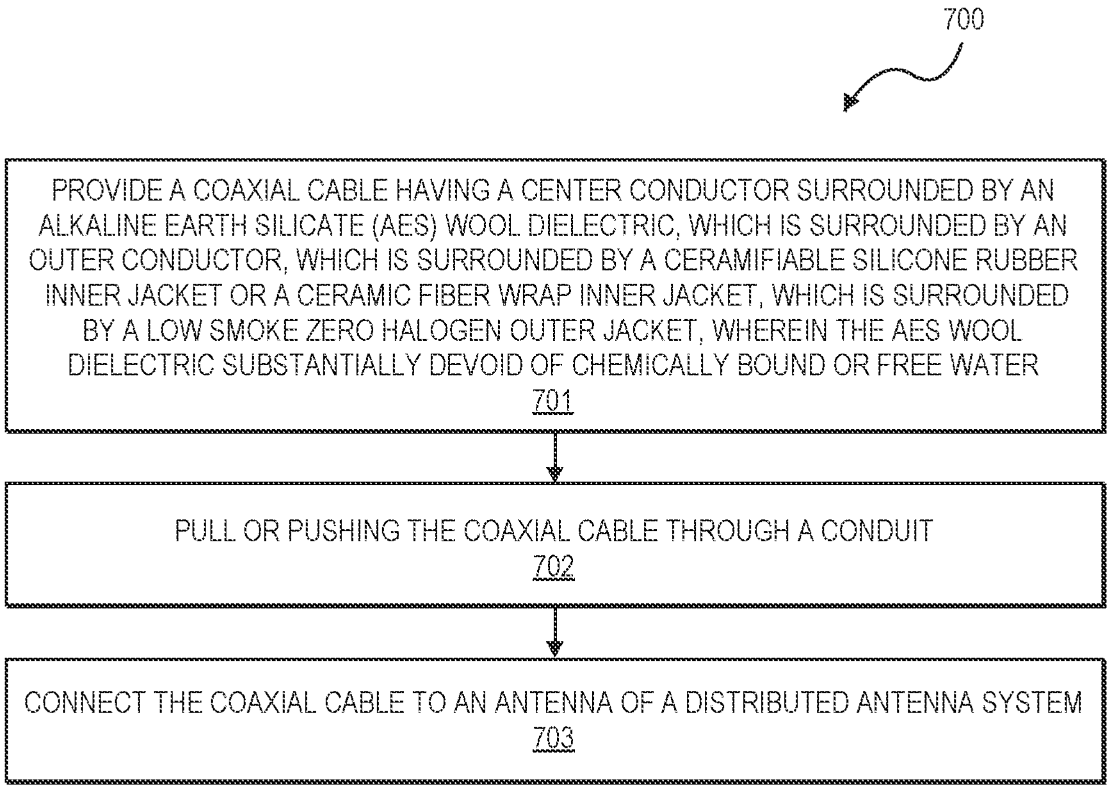
FIG. 7 is a flowchart in accordance with an embodiment.
Figure 8:
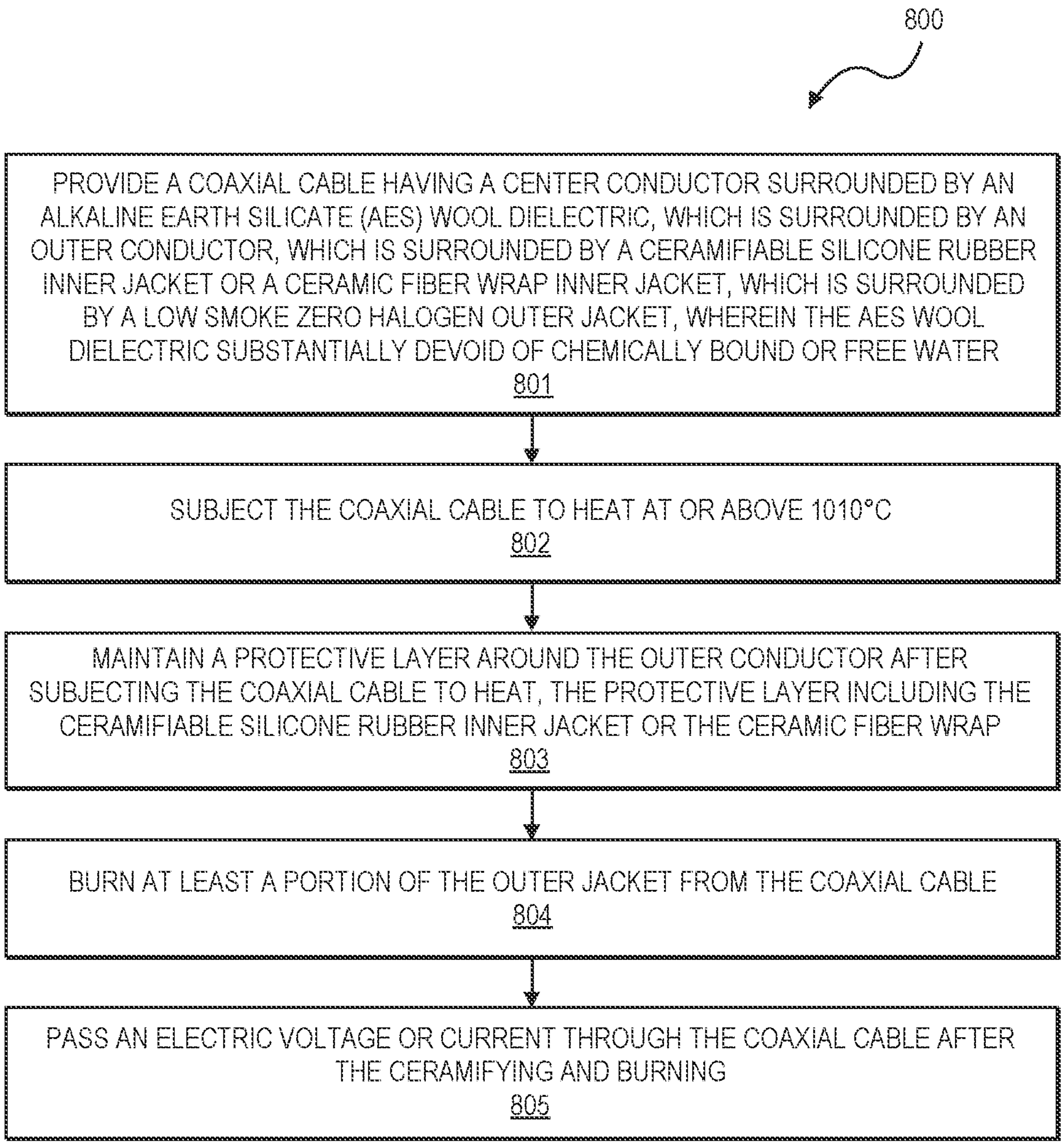
FIG. 8 is a flowchart in accordance with an embodiment.

FIG. 7 is a flowchart of a process 700 in accordance with an embodiment. In operation 701, a coaxial cable having a center conductor surrounded by an alkaline earth silicate (AES) wool dielectric, which is surrounded by an outer conductor, which is surrounded by a ceramifiable silicone rubber inner jacket or a ceramic fiber wrap inner jacket, which is surrounded by a low smoke zero halogen outer jacket, wherein the AES wool dielectric substantially devoid of chemically bound or free water is provided. In operation 702, the coax cable is pulled or pushed through a conduit. In operation 703, the coax cable is connected to an antenna of a distributed antenna system FIG. 8 is a flowchart of process 800 in accordance with an embodiment. In operation 801, a coaxial cable having a center conductor surrounded by an alkaline earth silicate (AES) wool dielectric, which is surrounded by an outer conductor, which is surrounded by a ceramifiable silicone rubber inner jacket or a ceramic fiber wrap inner jacket, which is surrounded by a low smoke zero halogen outer jacket, wherein the AES wool dielectric substantially devoid of chemically bound or free water is provided. In operation 802, the coax cable is subjected to heat at or above 1010° C. In operation 803, the ceramifiable silicone rubber inner jacket or the ceramic fiber wrap inner jacket is ceramified. In operation 804, at least a portion of the outer jacket of the coaxial cable is burned. In operation 805, an electric voltage or current is passed through the coaxial cable after the ceramifying and burning.

Although specific embodiments of the invention have been described, various modifications, alterations, alternative constructions, and equivalents are also encompassed within the scope of the invention. Embodiments of the present invention are not restricted to operation within certain specific environments, but are free to operate within a plurality of environments. Additionally, although method embodiments of the present invention have been described using a particular series of and steps, it should be apparent to those skilled in the art that the scope of the present invention is not limited to the described series of transactions and steps.

Further, while embodiments of the present invention have been described using a particular combination of hardware, it should be recognized that other combinations of hardware are also within the scope of the present invention.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A fire resistant corrugated coaxial cable apparatus comprising:

a center conductor;

a corrugated outer conductor surrounding the center conductor; and an alkaline earth silicate (AES) wool dielectric extending between the center conductor and the outer conductor, the AES wool dielectric being substantially devoid of chemically bound or free water and being configured to maintain a predetermined dielectric spacing between the center conductor and the outer conductor when exposed to heat at or above 1010° C. in order to continue to propagate radio frequency (RF) signals therein.

2. The apparatus of claim 1 further comprising:

a ceramifiable silicone rubber inner jacket or a ceramic fiber wrap inner jacket surrounding the corrugated outer conductor.

3. The apparatus of claim 2 further comprising:

a smooth outer jacket surrounding the ceramifiable silicone rubber inner jacket or the ceramic fiber wrap inner jacket, wherein the outer jacket is comprised of a low-smoke zero-halogen (LSZH).

4. The apparatus of claim 2 wherein the ceramic fiber inner jacket includes a glass substrate.

5. The apparatus of claim 2 wherein the ceramic fiber inner jacket includes a phyllosilicate mineral.

6. The apparatus of claim 2 wherein the ceramic fiber inner jacket includes a multi-ply tape, and the multi-ply tape having at least one ply of glass.

7. The apparatus of claim 6, wherein the multi-ply tape includes at least one ply of mica.

8. The apparatus of claim 2 wherein the ceramic fiber inner jacket includes an AES wool inner jacket.

9. The apparatus of claim 1 wherein the AES wool comprises fibers having a composition weight percentage of:

(a) 58.5%<$SiO_2$<68.9%

(b) 18.1%<CaO<40.5%

(c) 0.11%<MgO<16.4%

(d) 0<$Al_2O_3$<1.5%

(e) 0<$ZrO_2$<4.5%

(f) O<$B_2O_3$<8.41%

(g) O<$Fe_2O_3$<2.9%

(h) 0<$Na_2O$<2.6%

(i) 0<$TiO_2$<10% wherein the total quantity of $Al_2O_3$, $ZrO_2$, $TiO_2$, $B_2O_3$ and iron oxides does not exceed 10 wt % based upon the total fiber composition.

10. The apparatus of claim 1 wherein the AES wool comprises fibers having a composition weight percentage of:

72%<$SiO_2$<86%

0<MgO<10%

14%<CaO<28%

$Al_2O_3$<2%

$ZrO_2$<33%

$B_2O_3$<5%

$P_2O_5$<55%

95%<$SiO_2$+CaO+MgO+$Al_2O_3$+$ZrO_2$+$B_2O_3$+$P_2O_5$.

11. The apparatus of claim 10, wherein the AES wool comprises fibers having a composition weight percentage of:

72%<$SiO_2$+$ZrO_2$+$B_2O_3$+5*$P_2O_5$.

12. The apparatus of claim 1 wherein the AES wool comprises fibers having a composition weight percentage of:

65%<$SiO_2$<86%

MgO<10%

13.5%<CaO<27.5%

$Al_2O_3$<2%

$ZrO_2$<33%

$B_2O_3$<5%

$P_2O_5$<5%

72%<$SiO_2$+$ZrO_2$+$B_2O_3$+5*$P_2O_5$

95%<$SiO_2$+CaO+MgO+$Al_2O_3$+$ZrO_2$+$B_2O_3$+$P_2O_5$ 0.2%<$M_2O$<1.5% in which M is alkali metal and which at least 75 mol % of the alkali metal is potassium and soluble in physiological saline solution to give non-toxic dissolved components.

13. The apparatus of claim 1 wherein the AES wool comprises fibers having a composition weight percentage of:

65%<$SiO_2$<86%

MgO<10%

14%<CaO<28%

$Al_2O_3$<2%

$ZrO_2$<33%

$B_2O_3$<5%

$P_2O_5$<55%

72%<$SiO_2$+$ZrO_2$+$B_2O_3$+5*$P_2O_5$

95%<$SiO_2$+CaO+MgO+$Al_2O_3$+$ZrO_2$+$B_2O_3$+$P_2O_5$.

14. The apparatus of claim 1, wherein the AES wool dielectric wraps around the center conductor in a periodic manner.

15. A method of manufacturing a fire resistant coaxial cable, the method comprising:

surrounding a center conductor with an alkaline earth silicate (AES) wool dielectric, wherein the AES wool dielectric is substantially devoid of chemically bound or free water and is configured to maintain a predetermined dielectric spacing between the center conductor and an outer conductor when exposed to heat at or above 1010° C. in order to continue to propagate radio frequency (RF) signals therein; and encasing the AES wool dielectric with an outer conductor, the outer conductor maintained at a predetermined spacing from the center conductor by the AES wool dielectric.

16. The method of claim 15, further comprising:

insulating the outer conductor with a refractory insulating jacket, wherein insulating the outer conductor with a refractory insulating jacket comprises wrapping a ceramic fiber inner jacket around the outer conductor.

17. The method of claim 16, wherein the ceramic fiber inner jacket comprises a glass substrate.

18. The method of claim 16, wherein the ceramic fiber inner jacket comprises a multi-ply tape.

19. The method of claim 16, wherein the ceramic fiber inner jacket comprises an AES wool inner jacket.

20. The method of claim 16 further comprising:

enclosing the refractory insulating jacket with a low smoke zero halogen outer jacket.

21. The method of claim 15, wherein the surrounding includes wrapping the AES wool dielectric around the center conductor in a periodic manner.

22. A fire resistant corrugated coaxial cable apparatus comprising:

a center conductor;

a corrugated outer conductor surrounding the center conductor; and an alkaline earth silicate (AES) wool dielectric extending between the center conductor and the outer conductor, the AES wool dielectric being substantially devoid of chemically bound or free water and being configured to propagate radio frequency (RF) signals therein, wherein the AES wool comprises fibers have a composition weight percentage of:

(a) 58.5%<$SiO_2$<68.9%

(b) 18.1%<CaO<40.5%

(c) 0.11%<MgO<16.4%

(d) 0<$Al_2O_3$<1.5%

(e) 0<$ZrO_2$<4.5%

(f) 0<$B_2O_3$<8.41%

(g) 0<$Fe_2O_3$<2.9%

(h) 0<$Na_2O$<2.6%

(i) 0<$TiO_2$<10% wherein the total quantity of $Al_2O_3$, $ZrO_2$, $TiO_2$, $B_2O_3$ and iron oxides does not exceed 10 wt % based upon the total fiber composition.

23. A fire resistant corrugated coaxial cable apparatus comprising:

a center conductor;

a corrugated outer conductor surrounding the center conductor; and an alkaline earth silicate (AES) wool dielectric extending between the center conductor and the outer conductor, the AES wool dielectric being substantially devoid of chemically bound or free water and being configured to propagate radio frequency (RF) signals therein, wherein the AES wool comprises fibers have a composition weight percentage of:

72%<$SiO_2$<86%

0<MgO<10%

14%<CaO<28%

$Al_2O_3$<2%

$ZrO_2$<3%

$B_2O_3<5\%$ $P_2O_5<5\%$ $95\%<SiO_2+CaO+MgO+Al_2O_3+ZrO_2+B_2O_3+P_2O_5$.

24. The apparatus of claim 23, wherein the AES wool comprises fibers having a composition weight percentage of:

$72\%<SiO_2+ZrO_2+B_2O_3+5*P_2O_5$.

* * * * *